(12) United States Patent
Li et al.

(10) Patent No.: US 11,461,561 B2
(45) Date of Patent: Oct. 4, 2022

(54) METHOD AND DEVICE FOR INFORMATION PROCESSING, AND STORAGE MEDIUM

(71) Applicant: Beijing Xiaomi Intelligent Technology Co., Ltd., Beijing (CN)

(72) Inventors: Xiang Li, Beijing (CN); Yuhui Sun, Beijing (CN); Xiaolin Wu, Beijing (CN); Jianwei Cui, Beijing (CN)

(73) Assignee: Beijing Xiaomi Intelligent Technology Co., Ltd., Beijing (CN)

( * ) Notice: Subject to any disclaimer, the term of this patent is extended or adjusted under 35 U.S.C. 154(b) by 176 days.

(21) Appl. No.: 16/744,768

(22) Filed: Jan. 16, 2020

(65) Prior Publication Data

US 2021/0124880 A1 Apr. 29, 2021

(30) Foreign Application Priority Data

Oct. 25, 2019 (CN) .......................... 201911025249.7

(51) Int. Cl.
*G06F 40/58* (2020.01)
*G06N 20/00* (2019.01)
*G06F 40/51* (2020.01)

(52) U.S. Cl.
CPC .............. *G06F 40/58* (2020.01); *G06F 40/51* (2020.01); *G06N 20/00* (2019.01)

(58) Field of Classification Search
CPC .......... G06F 40/58; G06F 40/51; G06F 40/47; G06F 40/45; G06F 30/27; G06F 30/20;
(Continued)

(56) References Cited

U.S. PATENT DOCUMENTS 5,477,451 A * 12/1995 Brown .................... G06F 40/49
704/9
8,818,792 B2 8/2014 Hwang et al.
(Continued)

FOREIGN PATENT DOCUMENTS

CN 101290616 A 10/2008
CN 103631772 A 3/2014
(Continued)

OTHER PUBLICATIONS

Grant of Patent for Korean Application No. 10-2020-7001087, dated Sep. 23, 2021.
(Continued)

*Primary Examiner* — Jakieda R Jackson
(74) *Attorney, Agent, or Firm* — Finnegan, Henderson, Farabow, Garrett & Dunner, L.L.P.

(57) ABSTRACT

A method for information processing, includes: obtaining a bilingual vocabulary containing N original bilingual word pairs, N being a positive integer; obtaining an original bilingual training set containing multiple original bilingual training sentence pairs; selecting at least one original bilingual training sentence pair matching any original bilingual word from the original bilingual training set as a bilingual sentence pair candidate; constructing a generalized bilingual sentence pattern based on at least one bilingual sentence pair candidate; and obtaining an augmented bilingual training set containing multiple augmented bilingual training sentence pairs, based on the bilingual vocabulary and the generalized bilingual sentence pattern.

18 Claims, 4 Drawing Sheets

(58) Field of Classification Search
CPC .......... G06F 40/55; G06F 40/56; G06F 40/30; G06F 40/237; G06F 40/20; G06N 20/00; G06N 3/08
See application file for complete search history.

(56) References Cited

U.S. PATENT DOCUMENTS

| | | | |
|---|---|---|---|
| 9,367,541 B1 * | 6/2016 | Servan et al. | G06F 17/289 704/2 |
| 2002/0198701 A1 | 12/2002 | Moore | |
| 2007/0239423 A1 | 10/2007 | Miller | |
| 2008/0086300 A1 | 4/2008 | Anismovich et al. | |
| 2009/0043564 A1 | 2/2009 | Hwang et al. | |
| 2012/0232883 A1 | 9/2012 | Anismovich et al. | |
| 2012/0296633 A1 | 11/2012 | Chalabi et al. | |
| 2013/0191109 A1 | 7/2013 | Anisimovich et al. | |
| 2018/0165278 A1 | 6/2018 | He et al. | |

FOREIGN PATENT DOCUMENTS

| | | |
|---|---|---|
| CN | 103914447 A | 7/2014 |
| CN | 104391885 A | 3/2015 |
| CN | 105068997 A | 11/2015 |
| CN | 106598959 A | 4/2017 |
| CN | 106649288 A | 5/2017 |
| CN | 108021560 A | 5/2018 |
| CN | 108241609 A | 7/2018 |
| CN | 108920473 A | 11/2018 |
| CN | 106156013 B | 2/2019 |
| CN | 109359308 A | 2/2019 |
| CN | 110334197 A | 10/2019 |
| JP | 2010-282453 A | 12/2010 |
| JP | 2015-022431 A | 2/2015 |
| JP | 2017-138655 A | 8/2017 |
| KR | 100912501 B1 | 8/2009 |
| KR | 20190046432 A | 5/2019 |
| RU | 2008152106 A | 7/2010 |
| RU | 2692049 C1 | 6/2019 |

OTHER PUBLICATIONS

Sreyashi Nag et al: "Incorporating Bilingual Dictionaries for Low Resource Semi-Supervised Neural Machine Translation", ICLR Conference 2019, May 9, 2019, XP081637466, 5 pages.
Marzieh Fadaee et al: "Data Augmentation for Low-Resource Neural Machine Translation", arxiv.org, Cornell University Library, 201 Olin Library Cornell University Ithaca, NY 14853, May 1, 2017, XP081276038, 7 pages.
Jason Wei et al: "EDA: Easy Data Augmentation Techniques for Boosting Performance on Text Classification Tasks", arxiv.org, Cornell University Library, 201 Olin Library Cornell University Ithaca, NY 14853, Jan. 31, 2019, XP081468743, 9 pages.
Supplementary European Search Report in European Application No. 20152542.5, dated Aug. 11, 2020.
Luong et al., Addressing the Rare Word Problem in Neural Machine Translation, Proceedings of ACL. May 30, 2015, 9 pages.
First Office Action of Russian Application No. 2020103383, dated Jun. 29, 2020.
International Search Report in International Application No. PCT/CN2019/123095, dated Jul. 24, 2020.
Notice of Reasons for Refusal dated Feb. 8, 2022, from the Japanese Patent Office issued in counterpart Japanese Application No. 2020-500705.
Notice of Reasons for Refusal for Japanese Application No. 2020-500705, dated Jul. 19, 2022.

* cited by examiner

METHOD AND DEVICE FOR INFORMATION PROCESSING, AND STORAGE MEDIUM

CROSS-REFERENCE TO RELATED APPLICATION

The present application is based upon and claims priority to Chinese Patent Application No. 201911025249.7 filed on Oct. 25, 2019, the entire contents of which are incorporated herein by reference.

TECHNICAL FIELD

The present disclosure relates to the field of machine translation, and more particularly, to a method and device for information processing, and a storage medium.

BACKGROUND

Machine translation is a technology that can automatically translate one language into another through a machine translation model and is greatly valuable to academic and market application. Generally, the higher the quality of bilingual parallel training corpora, the larger the scale, and the wider the industry coverage, the higher the translation quality of the machine translation model obtained based on the training corpora. The translation quality of the machine translation model generally depends on the quality and amount of available bilingual data, but at present, it is difficult to obtain a large scale of high-quality bilingual data.

SUMMARY

According a first aspect of the embodiments of the present disclosure, a method for information processing includes: obtaining a bilingual vocabulary containing N original bilingual word pairs, each of the N original bilingual word pairs containing a first word represented in a first language and a second word represented in a second language and having same meaning as the first word, N being a positive integer; obtaining an original bilingual training set containing multiple original bilingual training sentence pairs, each of the multiple original bilingual training sentence pair containing a first training sentence represented in the first language and a second training sentence represented in the second language and having same meaning as the first training sentence; selecting at least one original bilingual training sentence pair matching any of the N original bilingual word pairs from the original bilingual training set as at least one bilingual sentence pair candidate: constructing a generalized bilingual sentence pattern based on the at least one bilingual sentence pair candidate; and obtaining an augmented bilingual training set containing multiple augmented bilingual training sentence pairs based on the bilingual vocabulary and the generalized bilingual sentence pattern.

According a second aspect of the embodiments of the present disclosure, a device for information processing include: a processor: and a memory configured to store instructions executable by the processor; wherein the processor is configured to: obtain a bilingual vocabulary containing N original bilingual word pairs, each of the N original bilingual word pairs containing a first word represented in a first language and containing a second word represented in a second language and having same meaning as the first word, and N being a positive integer; obtain an original bilingual training set containing multiple original bilingual training sentence pairs, each of the multiple original bilingual training sentence pair containing a first training sentence represented in the first language and containing a second training sentence represented in the second language and having same meaning as the first training sentence; select at least one original bilingual training sentence pair matching any of the N original bilingual word pairs from the original bilingual training set as at least one bilingual sentence pair candidate: construct a generalized bilingual sentence pattern based on the at least one bilingual sentence pair candidate: and obtain an augmented bilingual training set containing multiple augmented bilingual training sentence pairs based on the bilingual vocabulary and the generalized bilingual sentence pattern.

According a third aspect of the embodiments of the present disclosure, a non-transitory computer-readable storage medium has stored thereon instructions that, when executed by a processor of a device, cause the device to perform the method for information processing in the first aspect.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Terms used in the embodiments of the present disclosure are for the purpose of describing the specific embodiments only, and are not intended to limit the embodiments of the present disclosure. The terms "first," "second," and similar terms used in the specification and claims are not intended to indicate any order, quantity or importance, but only to distinguish different components. The terms "a" or "an" and the like do not denote a quantity limitation, but mean that there is at least one. It should also be understood that the term "and/or" as used herein refers to and encompasses any or all possible combinations of one or more of the associated listed items.

Figure 1:
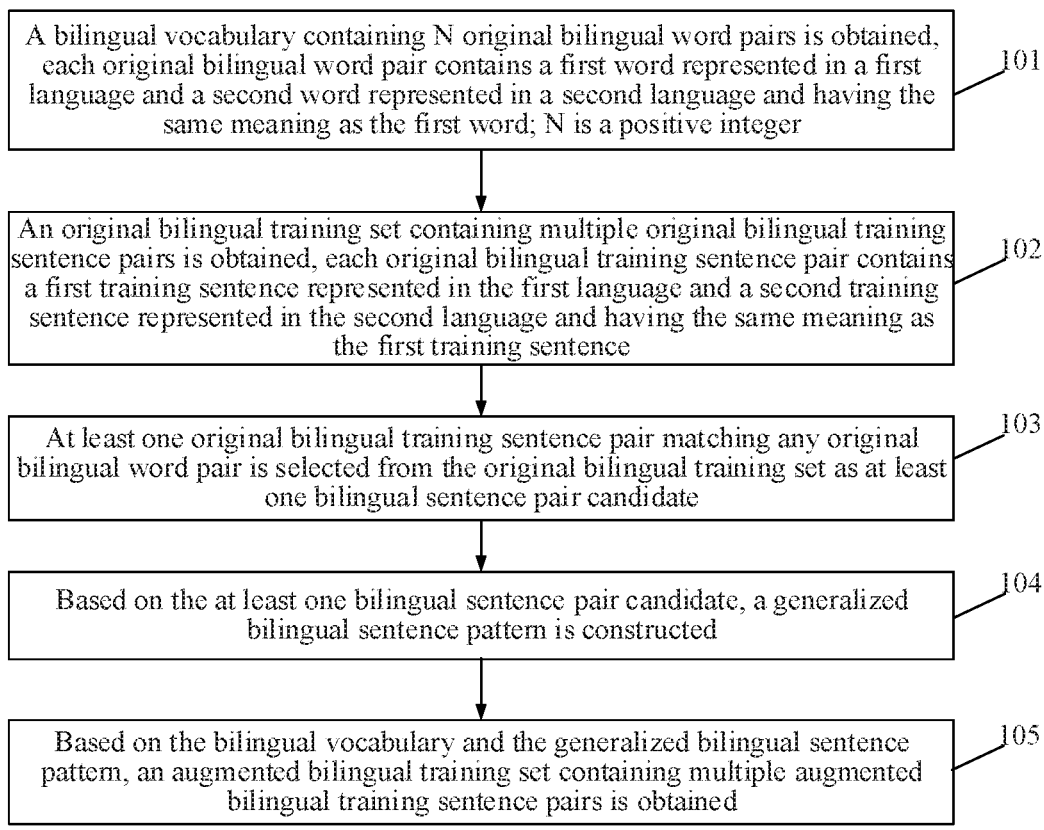
FIG. 1 is a flowchart illustrating a method for information processing according to an exemplary embodiment.

FIG. 1 is a flowchart illustrating a method for information processing according to an exemplary embodiment. As shown in FIG. 1, the method may include the following operations.

In operation 101, a bilingual vocabulary containing N original bilingual word pairs is obtained, each original bilingual word pair contains a first word represented in a first language and contains a second word represented in a second language and having the same meaning as the first word; N is a positive integer.

In operation 102, an original bilingual training set containing multiple original bilingual training sentence pairs is obtained, each original bilingual training sentence pair contains a first training sentence represented in the first language and contains a second training sentence represented in the second language and having the same meaning as the first training sentence.

In operation 103, at least one original bilingual training sentence pair matching any original bilingual word pair is selected from the original bilingual training set as at least one bilingual sentence pair candidate.

In operation 104, a generalized bilingual sentence pattern is constructed based on the at least one bilingual sentence pair candidate.

In operation 105, an augmented bilingual training set containing multiple augmented bilingual training sentence pairs is obtained based on the bilingual vocabulary and the generalized bilingual sentence pattern.

In the embodiment, the original bilingual word pair ma be obtained based on categories and fields of words by manually labeling a large number of bilingual words in the categories and fields. For example, the bilingual word pairs related to names can be determined. The original bilingual word pair may contain a first word represented in a first language and a second word represented in a second language and having the same meaning as the first word. For example, if the first language is Chinese, and the first word is "张三", then the second language is English, and the second word is "zhang san".

After the original bilingual word pair is obtained, a bilingual vocabulary may be constructed based on the original bilingual word pair. Table 1 below is a bilingual vocabulary according to an exemplary embodiment. In Table 1, there are three original bilingual word 张三 pairs; the first word contained in the first original bilingual word pair is "张三", and the second word is "zhang san"; the first word contained in the second original bilingual word pair is "李XX", and the second word is "li XX"; the first word contained in the third original bilingual word pair is "小红", and the second word is "xiao hong".

TABLE 1

| Bilingual vocabulary | |
|---|---|
| First word in first language | Second word in second language |
| 张三 | zhang san |
| 李 XX | li XX |
| 小红 | xiao hong |

In the embodiment, the bilingual vocabulary may be obtained by manually labeling a specific field. The bilingual vocabulary may include: unlisted words, low-frequency words and high-frequency words in the specific field. Since the bilingual words can be selected highly freely, the high-frequency words may be mainly used for finding more bilingual sentence patterns, the low-frequency words may be mainly used for supplementing data, and the unlisted words may be words not in the bilingual vocabulary. For example, if the bilingual vocabulary includes word a, word b and word c, then word d is an unlisted word. The unlisted word can be also called a word out of the set.

In the embodiments of the present disclosure, the original bilingual word pair containing any original bilingual word pair may be obtained from the original bilingual training set containing multiple original bilingual training sentence pairs based on the original bilingual word pair in the bilingual vocabulary. For example, the original bilingual training set may be searched for an original bilingual training sentence pair matching the original bilingual word pair based on the original bilingual word pair in the bilingual vocabulary, and the found original bilingual training sentence pair can be taken as a bilingual sentence pair candidate. For example, matching is performed on an original bilingual training sentence pair contained in the original bilingual training set based on an original bilingual word pair in the bilingual vocabulary, and the original bilingual training sentence pair containing the original bilingual word pair can be obtained according to a matching result and then the original bilingual training sentence pair containing the original bilingual word pair can be taken as a bilingual sentence pair candidate.

Table 2 below is an original bilingual training set according to an exemplary embodiment. The original bilingual training set in Table 2 contains three original bilingual training sentence pairs, and each of the three original bilingual training sentence pairs contains a first training sentence represented in the first language and a second training sentence represented in the second language and having the same meaning as the first training sentence.

TABLE 2

| | Original bilingual training set | |
|---|---|---|
| | First training sentence in first language | Second training sentence in second language |
| 1 | 李XX 同时强调保持稳定的税收政策的重要性, 指出中国正处于经济恢复的关键时期。 | li XX also stressed the importance of maintaining a stable tax policy, pointing out that China is in a critical period of economic recovery. |
| 2 | 想知道在东莞科学馆附近怎么停车? | i'd like to know how to park near the dongguan science museum? |
| 3 | 每种花都有独特的含义。 | each flower has a unique meaning. |

In the embodiments of the present disclosure, in a process of obtaining a bilingual sentence pair candidate based on the bilingual vocabulary, each original bilingual word pair in the bilingual vocabulary may be compared with each original bilingual training sentence pair in the original bilingual training set, respectively. In the process of comparison, the first word in the first language may be compared with the first training sentence in the first language, and the second word in the second language may be compared with the second training sentence in the second language.

Taking that the first word in Table 1 is compared with the first training sentence in Table 2 for example, "张三" in the bilingual vocabulary shown in Table 1 may be respectively compared with "李XX同时强调保持稳定的税收政策的重要性，指出中国正处于经济恢复的关键时期。", "想知道在东莞科学馆附近怎么停车！", and "每种花都有独特的含义。" in Table 2. Since there is not any name in Table 2 matching "张三", it is indicated that the original bilingual training sentence pair in the original bilingual training set does not contain the original bilingual word pair.

In a case that "李XX" in the bilingual vocabulary shown in Table 1 is taken to be compared with "李XX同时强调保持稳定的税收政策的重要性，指出中国正处于经济恢复的关键时期。", "想知道在东莞科学馆附近怎么停车！", and "每种花都有独特的含义。" in Table 2 respectively, since there is a name in Table 2 matching 李XX", it is indicated that the original bilingual training sentence pair in the original bilingual training set contains the original bilingual word pair.

Before the original bilingual word pair in the bilingual vocabulary is compared with the original bilingual training sentence pair in the original bilingual training set, word division may be performed on the original bilingual training sentence pair in the original bilingual training set. Table 3 is a word division table according to an exemplary embodiment. As shown in Table 3, the original bilingual training sentence pair in the original bilingual training set can be divided according to word attributes, so that each divided word has full meaning.

TABLE 3

Word division table

| | First training sentence in first language | Second training sentence in second language |
|---|---|---|
| 1 | 李XX 同时 强调 保持 稳定 的 税收 政策 的 重要性, 指出 中国 正处于 经济 恢复 的 关键 时期 。 | li XX also stressed the importance of maintaining a stable tax policy, pointing out that china is in a critical period of economic recovery. |
| 2 | 想 知道 在 东莞科学馆 附近 怎么 停车? | i'd like to know how to park near the dongguan science museum? |
| 3 | 每种 花 都有 独特 的 含义 。 | each flower has a unique meaning. |

In the embodiments of the present disclosure, after the word division is performed on the original bilingual training sentence pair in the original bilingual training set, the original bilingual training set is searched for the original bilingual training sentence pair by traversing based on the original bilingual word in the bilingual vocabulary, and a bilingual sentence pair candidate can be obtained.

For example, "李XX同时 强调 保持 稳定 的 税收 政策 的 重要性, 指出 中国 正处于 经济 恢复 的 关键 时期 。" may be determined from Table 3 based on "李XX" in Table 1. Correspondingly, based on "li XX" in Table 1, "li XX also stressed the importance of maintaining a stable tax policy, pointing out that china is in a critical period of economic recovery." may be determined from Table 3, then it is indicated that at least one original bilingual training sentence pair matching any original bilingual word pair can be selected from the original bilingual training set based on the bilingual vocabulary as a bilingual sentence pair candidate.

After the bilingual sentence pair candidate is determined, a generalized bilingual sentence pattern may be constructed based on at least one bilingual sentence pair candidate. In the embodiment, the original bilingual word pair contained in the bilingual sentence pair candidate may be replaced with the general bilingual word pair to generate a generalized bilingual sentence pattern. For example, upon that 37 李XX同时 强调 保持 稳定 的 税收 政策 的 重要性, 指出 中国 正处于 经济 恢复 的 关键 时期 。" is determined from Table 3 as a sentence in the bilingual sentence pair candidate based on "李XX", "李XX" may be replaced with "<X1>". <X1> may be a general bilingual word or any other person's name. The word attribute of <X1> may be the same as "李XX". For example, <X1> and "李XX" can be aligned with each other, thereby having no influence on the whole sentence pattern.

Taking that the original bilingual word pair in the bilingual sentence pair candidate is replaced based on a general bilingual word for example, after replacement is performed based on a general bilingual word, a corresponding generalized bilingual sentence pattern can be obtained: in this way, a large number of augmented bilingual training sentence pairs and an augmented bilingual training set containing multiple augmented bilingual training sentence pairs can be obtained by replacing the general bilingual word in the generalized bilingual sentence pattern with any other personal name, and then corpora resources in a bilingual corpus can be enriched.

In the embodiments of the present disclosure, the bilingual vocabulary contains a large number of new words, and a large number of generalized bilingual sentence patterns can be generated, therefore, generalization of a bilingual sentence pair candidate can be achieved, so as to augment the original bilingual training set to obtain the augmented bilingual training set with rich contents, that is, large-scale and high-quality bilingual corpora can be obtained, and thus the corpora resources in the bilingual corpus can be updated and enriched.

In some embodiments, the first training sentence contained in the original bilingual training sentence pair selected as the bilingual sentence pair candidate at least may include: the first word contained in any original bilingual word pair.

The second training sentence contained in the original bilingual training sentence pair selected as the bilingual sentence pair candidate at least may include: the second word having the same meaning as the first word contained in any original bilingual word pair.

For example, "李XX同时 强调 保持 稳定 的 税收 政策 的 重要性, 指出 中国 正处于 经济 恢复 的 关键 时期 。" may be determined from Table 3 based on "李XX" in Table 1. Correspondingly, "li XX also stressed the importance of maintaining a stable tax policy, pointing out that china is in a critical period of economic recovery." may be determined from Table 3 based on "li XX" in Table 1. "李XX" is the first word contained in any original bilingual word pair, and "li XX" is the second word contained in any original bilingual word pair. Two sentences determined from Table 3 are respectively the first training sentence contained in the bilingual sentence pair candidate and the second sentence contained in the bilingual sentence pair candidate. By determining the bilingual sentence pair candidate from the original bilingual training sentence in the original bilingual training set through the original bilingual word pair in the bilingual vocabulary, the bilingual sentence pair candidate needed by a user can be determined accurately, and thus an accurate generalized bilingual sentence pattern can be obtained.

In some embodiments, the operation that based on at least one bilingual sentence pair candidate, the generalized bilingual sentence pattern is constructed may include: M bilingual sentence pairs to be generalized are determined from the at least one bilingual sentence pair candidate according to a preset condition, M being a positive integer: and M generalized bilingual sentence patterns are generated based on the M bilingual sentence pairs to be generalized.

The operation that the augmented bilingual training set containing multiple augmented bilingual training sentence pairs is obtained based on the bilingual vocabulary and the generalized bilingual sentence pattern may include: multiple augmented bilingual training sentence pairs are generated according to the M generalized bilingual sentence patterns and the N original bilingual word pairs contained in the bilingual vocabulary; and the augmented bilingual training set is obtained based on the multiple augmented bilingual training sentence pairs.

In some embodiments, the preset condition may include at least one of following: both a sentence length of the first training sentence and a sentence length of the second training sentence are greater than or equal to a preset sentence length threshold; a ratio of the sentence length of the first training sentence to the sentence length of the second training sentence is greater than or equal to a first preset ratio, and smaller than or equal to a second preset ratio; or both translation accuracy of the first training sentence and translation accuracy of the second training sentence are greater than a preset accuracy threshold.

The sentence length of the first training sentence and the sentence length of the second training sentence may be the number of words contained in the first training sentence and the number of words contained in the second training sentence, respectively, after word division is performed on the first training sentence and the second training sentence. For example, word division is performed on the first training sentence contained in the bilingual sentence pair candidate, the number of words obtained after the word division may be taken as the sentence length of the first training sentence.

Taking that the first training sentence is "李XX 同时强调保持稳定的税收政策 的重要性, 指出中国正处于经 齐恢复的关键时期." for example, the first training sentence after the word division is "李XX 同时 强调 保持 稳定 的 税收 政策 的 重要性, 指 出 中国 正处于 经济 恢复 的 关键 时期", thus, the sentence length of the first training sentence is 20 in the example. In the implementation, the words in the sentence may be divided through a separation character or a space character.

In the embodiments of the present disclosure, the preset sentence length threshold, the first preset ratio, the second preset ratio, and the preset accuracy threshold can be set according to needs. For example, the preset sentence length threshold may be set as 10, the first preset ratio may be set as 1/5, the second preset ratio may be set as 5, and the preset accuracy threshold may be set as 0.25.

By setting a lower limit for the first training sentence and the second training sentence, it can be ensured that all sentences contained in the obtained bilingual sentence pair to be generalized are long sentences rather than phrases or words: in this way, efficiency and effectiveness of data processing can be improved.

In the embodiment, the first training sentence and the second training sentence have the same meaning and just use different languages. Therefore, when the first training sentence and the second training sentence are translated into each other, the ratio of the translated sentence length to the original sentence length can be within a preset range. In a case that the ratio is not in the preset range, it is indicated that corpus data corresponding to the training sentence may be inaccurate. In the embodiments of the present disclosure, by setting the range of the ratio of the first training sentence to the second training sentence, the accuracy of the corpus data can be ensured. The accuracy of the corpus data can be further ensured by obtaining the accuracy of translation between the first training sentence and the second training sentence and taking the corpus data containing the first training sentence and the second training sentence as the effective corpus data only when the accuracy of translation is higher than the preset accuracy threshold.

In the embodiments of the present disclosure, M bilingual sentence pairs to be generalized may be determined from the at least one bilingual sentence pair candidate according to the preset condition. The probability of finding inaccurate data can be reduced by restricting a condition of filtering the bilingual sentence pair to be generalized, and the accuracy of the bilingual sentence pair to be generalized can be improved.

In some embodiments, the operation that M generalized bilingual sentence patterns are generated based on the M bilingual sentence pairs to be generalized may include: K original bilingual word pairs contained in the M bilingual sentence pairs to be generalized are replaced with K general bilingual word pairs and the M generalized bilingual sentence patterns are generated, K being a positive integer.

The operation that multiple augmented bilingual training sentence pairs are generated according to the M generalized bilingual sentence patterns and N original bilingual word pairs contained in the bilingual vocabulary may include: each of the K general bilingual word pairs in the M generalized bilingual sentence patterns is replaced with N original bilingual word pairs contained in the bilingual vocabulary and K*N*M augmented bilingual training sentence pairs are generated.

In the embodiment, M generalized bilingual sentence patterns respectively containing K general bilingual word pairs may be generated by replacing the K original bilingual word pairs contained in the M bilingual sentence pairs to be generalized with K general bilingual word pairs. When the words of multiple types of word attributes in the M generalized bilingual sentence patterns are needed to be replaced, compatibility also can be achieved. For example, M generalized bilingual sentence patterns in which either a noun or a verb may be replaced can be generated.

K*N*M augmented bilingual training sentence pairs may be generated by replacing each of the K general bilingual word pairs in the M generalized bilingual sentence patterns with N original bilingual word pairs contained in the bilingual vocabulary.

In this way, more generalized bilingual sentence patterns can be obtained. Upon that a replacement character in the generalized bilingual sentence pattern is replaced with the original bilingual word pair in the bilingual vocabulary, more bilingual corpora data can be obtained, and flexibility and diversity of obtaining data can be improved.

When M=1, namely, there is only one bilingual sentence pair to be generalized and the bilingual sentence pair to be generalized contains K original bilingual words, the K original bilingual words may be replaced with K general bilingual words, and a generalized bilingual sentence pattern may be generated. In this way, each general bilingual word in the generalized bilingual sentence pattern can be replaced with N original bilingual words in the bilingual vocabulary to generate N*K augmented bilingual training sentence pairs.

In the embodiments of the present disclosure, by replacing the original bilingual word pair in the bilingual sentence pair to be generalized with the general bilingual word different from other words in the bilingual sentence pair to be generalized, it is possible to quickly locate the general bilingual word and perform corresponding processing on the general bilingual word. For example, the original bilingual word pair in the bilingual sentence pair to be generalized may be replaced with the general bilingual word pair having the same word attribute as other words in the bilingual sentence pair to be generalized, then, a complete sentence pair can be constructed based on the general bilingual word pair and other words already existing in the bilingual sentence pair to be generalized, which can reduce incompatibility between the added general bilingual word and the generalized bilingual sentence pattern and also improve efficiency of data processing.

In the embodiments of the present disclosure, by generating the generalized bilingual sentence pattern through the bilingual vocabulary and the bilingual sentence pair to be generalized, and by generalizing and augmenting the generalized bilingual sentence pattern based on the original bilingual word pair in the bilingual vocabulary, a large-scale augmented bilingual training sentence pair can be obtained to generate the augmented bilingual training set. Data quality of the augmented bilingual training set can also be improved based on that the data in the bilingual vocabulary and the bilingual sentence pair to be generalized is obtained by accurate filtering.

In the embodiments of the present disclosure, the general bilingual word may be a character or a combination of characters not interfering word recognition in the first language and the second language. For example, the general bilingual word may also be a character or a combination of characters of languages other than the first language and the second language.

In some embodiments, the general bilingual word may include: a non-terminating character. The non-terminating character may be for indicating that a sentence is not terminated.

By setting the general bilingual word as the non-terminating character, when a first bilingual word in first bilingual corpora data is replaced with the general bilingual word, the impact of the general bilingual word on the attribute of the whole sentence can be reduced, and the accuracy of obtained second bilingual corpora data can be improved.

In some embodiments, the method may further include: performing fusion processing on the augmented bilingual training set and the original bilingual training set to obtain a target bilingual training set; and performing model training to obtain a target translation model based on the target bilingual training set.

The target translation model may be for translating corpus data between the first language and the second language.

In some embodiments, the word attributes of the first bilingual word and the second bilingual word may be noun.

In the embodiment, after the fusion processing is performed on the augmented bilingual training set and the original bilingual training set to obtain the target bilingual training set, a new machine translation model can be trained based on a preset machine translation model, thereby improving the translation quality of the machine translation model.

In some embodiments, the word attributes of the first word and the second word may be noun, adjective, verb, adverb, etc., which are not specifically limited here.

Figure 2:
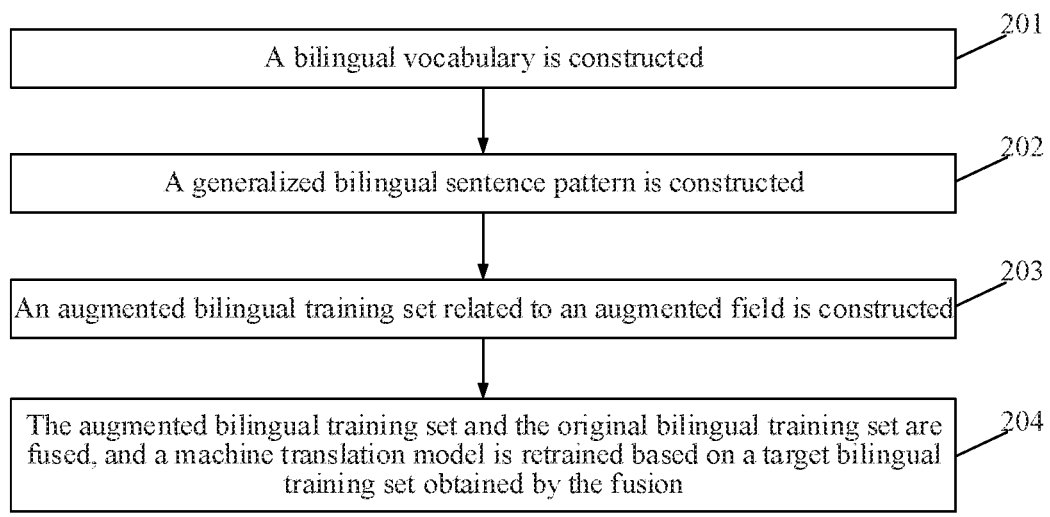
FIG. 2 is a flowchart illustrating a method for information processing according to an exemplary embodiment.

FIG. 2 is a flowchart illustrating a method for information processing according to an exemplary embodiment. As shown in FIG. 2, the method may include the following operations.

In operation 201, a bilingual vocabulary is constructed.

In the embodiment, a category and a field of a notional word may be determined according to a translation error caused by naming the notional word, and a bilingual word pair corresponding to the notional word may be determined. For example, a large number of bilingual word pairs lex={ (lex_$x_1$, lex_$y_1$), ..., (lex_$x_n$, lex_$y_n$)} in the field may be labeled manually, and then the bilingual vocabulary may be constructed according to the bilingual word pair, where lex represents the bilingual word pair contained in the bilingual vocabulary, lex_$x_1$ represents the bilingual word of the $1^{st}$ first language, lex_$y_1$ represents the bilingual word of the $1^{st}$ second language, lex_$x_i$ represents the bilingual word of the $i^{th}$ first language, lex_$y_i$ represents the bilingual word of the $i^{th}$ second language, lex_$x_n$ represents the bilingual word of the $n^{th}$ first language, and lex_$y_n$ represents the bilingual word of the nth second language; i and n are positive integers.

Taking that the notional word is a personal name for example. The coverage of existing bilingual data for personal names is limited, the machine translation model trained based on the bilingual data cannot translate the input personal name accurately, and thus an incorrect translation result may be generated. In such a case, a large number of bilingual personal names may be collected according to the translation errors fed back by a user, and a bilingual dictionary based on the personal names, namely the bilingual vocabulary based on the personal names, may be generated. Table 4 below is a bilingual dictionary of personal names according to an exemplary embodiment. In the embodiment, "李 XX|||li XX" are high-frequency bilingual words and also belong to the category of personal names, "|||" is a separation symbol. During construction of the bilingual dictionary, besides the unlisted words and the low-frequency words in the training data, the high-frequency words of this category may also be added to the bilingual dictionary for further searching the original bilingual training set for a related bilingual sentence pattern.

TABLE 4

| Bilingual dictionary of personal names | |
|---|---|
| Personal name word in first language | Personal name word in second language |
| 刘XX | liu XX |
| 蔡XX | cai XX |
| 张XX | zhang XX |
| 林XX | lin XX |
| 李XX | li XX |

In operation 202, the generalized bilingual sentence pattern is constructed.

In the embodiment, the original bilingual training set $D=\{(x_1,y_1), \ldots, (x_m,y_m)\}$ may be automatically searched for a matching bilingual sentence pair candidate according to the bilingual word pair in a specific field collected in operation 201, and then the bilingual sentence pair to be generalized may be obtained based on the bilingual sentence pair candidate, and the highly-available generalized bilingual sentence pattern with a bilingual aligned non-terminating character may be obtained by filtering according to a preset rule, where $x_1$ represents the first training sentence in the $1^{st}$ first language, $y_1$ represents the second training sentence in the $1^1$ second language, $x_m$ represents the first training sentence in the $m^{th}$ first language, and $y_m$ represents the second training sentence in the $m^{th}$ second language; m is a positive integer. An example is below.

(1) English-Chinese bilingual data is taken for example. Table 5 below is an original bilingual training set D according to an exemplary embodiment. Supposing that the original bilingual training set D contains 5 original bilingual training sentence pairs as follows:

TABLE 5

| Original bilingual training set | |
|---|---|
| First training sentence in first language | Second training sentence in second language |
| 1 | 李XX 同时强调保持稳定的税收政策的重要性，指出中国正处于经济恢复的关键时期。 | li also stressed the importance of maintaining a stable tax policy, pointing out that china is in a critical period of economic recovery. |
| 2 | 想知道在东莞科学馆附近怎么停车？ | i'd like to know how to park near the dongguan science museum? |
| 3 | 每种花都有独特的含义。 | each flower has a unique meaning. |
| 4 | 李XX 将于周五晚间在澳大利亚首都堪培拉同澳大利亚总理会晤。 | li XX will meet with australian prime minister in the australian capital canberra on friday night. |
| 5 | 为了阻止空气被污染，必须采取一些措施。 | some measures must be taken to prevent the air from being polluted. |

(2) The word division is performed on a Chinese original language sentence (the first training sentence) and an English target language sentence (the second training sentence) in the original bilingual training set D. Table 6 below is an original bilingual training set after the word division according to an exemplary embodiment. In the embodiment, the original bilingual training set after the word division is as follows:

TABLE 6

| Original bilingual training set after division | |
|---|---|
| First training sentence in first language | Second training sentence in second language |
| 1 | 李XX 同时 强调 保持 稳定 的 税收 政策 的 重要性，指出 中国 正处于 经济 恢复 的 关键 时期 。 | li also stressed the importance of maintaining a stable tax policy, pointing out that china is in a critical period of economic recovery. |
| 2 | 想 知道 在 东莞 科学馆 附近 怎么 停车？ | i'd like to know how to park near the dongguan science museum? |
| 3 | 每种 花 都有 独特 的 含义 。 | each flower has a unique meaning. |
| 4 | 李XX 将 于 周五 晚间 在 澳大利亚 首都 堪培拉 同 澳大利亚 总理 会晤 。 | li XX will meet with australian prime minister in the australian capital canberra on friday night. |
| 5 | 为了 阻止 空气 被 污染，必须 采取 一些 措施 。 | some measures must be taken to prevent the air from being polluted. |

(3) Each bilingual word $lex_i=(lex\_x_i, lex\_y_i)$ in the bilingual vocabulary lex is traversed, where lex represents the bilingual vocabulary, $lex_i$ represents the bilingual word in the bilingual vocabulary, $lex\_x_i$ represents the bilingual word in the $i^{th}$ first language, and $lex\_y_i$ represents the bilingual word in the $i^t$ second language; the original bilingual training set D is searched for the bilingual sentence pair $D_{match}=\{(x_1,y_1), \ldots, (x_s,y_s)\}$, where $D_{match}$ represents the bilingual sentence pair found from the original bilingual training set D, $x_1$ represents the first training sentence in the $1^{st}$ first language, $y_1$ represents the second training sentence in the $1^{st}$ second language; $x_s$ represents the first training sentence in the $s^{th}$ first language, and $y_s$ represents the second training sentence in the $s^{th}$ second language; $D_{match}$ satisfies the preset condition, and the preset condition may include at least one of followings conditions:

a) the sentence lengths of both $x_i$ and $y_i$ cannot be smaller than 10;

b) $x_i$ contains one $lex\_x_i$, and $y_i$ also contains one $lex\_y_i$;

c) the ratio of the sentence length of $x_i$ to the sentence length of $y_i$ is not greater than 5 and not smaller than 1/5;

d) $x_i$ and $y_i$ match one bilingual word pair at most:

e) according to the existing machine translation model from a source language sentence to a target language sentence (src→tgt) and the existing machine translation model from a reverse target language to a source language (tgt→src), $x_i$ is translated to obtain the translation $x_i'$, and $y_i$ is translated to obtain the translation $y_i'$, and then a Bilingual Evaluation Understudy (BLEU) tool is employed to evaluate $(x_i,x_i')$ and $(y_i,y_i')$ respectively and obtain the accuracy of translation $score_x$ and $score_y$; both $score_x$ and $score_y$ are greater than 0.25. $x_i$ represents the first training sentence in the $i^{th}$ first language, and $y_i$ represents the second training sentence in the $i^{th}$ second language.

Based on the above preset condition, the eligible bilingual sentence pair to be generalized $D_{sent\_match}$ may be obtained from the original bilingual training set D according to the bilingual vocabulary lex. Table 7 below is the bilingual sentence pair to be generalized according to an exemplary embodiment. In the embodiment, $D_{sent\_match}$ may include the following:

TABLE 7

| Bilingual sentence pair to be generalized | |
|---|---|
| First training sentence in first language | Second training sentence in second language |
| 1 | 李XX 将于 周五 晚间 在 澳大利亚 首都 堪培拉同 澳大利亚 总理 会晤 。 | li XX will meet with australian prime minister in the australian capital canberra on friday night. |

(4) For each bilingual sentence pair in $D_{sent\_match}$, the words matching in the source language sentence and the target language sentence may be respectively replaced with the non-terminating character "<X1>", so that the generalized bilingual sentence pattern $D_{aotu\_sent\_match}$ having generalization capability can be obtained. Table 8 below illustrates the generalized bilingual sentence pattern according to an exemplary embodiment. In the embodiment, $D_{aotu\_sent\_match}$ includes following:

TABLE 8

Generalized bilingual sentence pattern

| | Generalized bilingual sentence patter in first language | Generalized bilingual sentence patter in second language |
|---|---|---|
| 1 | <X1> 将于 周五 晚间 在 澳大利亚 首都 堪培拉同 澳大利亚 总理 会晤 。 | <X1> will meet with australian prime minister in the australian capital canberra on friday night. |

In some embodiments, besides that the bilingual sentence pattern is automatically extracted according to the original bilingual training set, bilingual sentence pattern data having the generalization capability $D_{manual\_sent\_pattern}$ may also be constructed by manual labeling with regard to the problem that translation of sentence pattern is incorrect. Table 9 below illustrates a bilingual sentence pattern data having the generalization capability according to an exemplary embodiment. In the embodiment, $D_{manual\_sent\_pattern}$ may include following:

TABLE 9

Bilingual sentence pattern data having generalization capability

| | Generalized bilingual sentence patter in first language | Generalized bilingual sentence patter in second language |
|---|---|---|
| 1 | 你 认识 <X1> 么？ | do you know <X1>? |

Based on the above method of automatic extracting and manual labeling, the high-quality and field-related generalized bilingual sentence pattern $D_{sent\_pattern}=\{D_{aotu\_sent\_pattern}, D_{manual\_sent\_pattern}\}$ may be obtained.

In operation 203, the augmented bilingual training set related to an augmented field is constructed.

In the embodiment, according to the constructed generalized bilingual sentence pattern with a bilingual aligned non-terminating character and a corresponding bilingual vocabulary lex, the bilingual aligned non-terminating character may be replaced with each bilingual word in the bilingual vocabulary by enumerating each bilingual sentence pattern; in such a manner, N*M high-quality augmented bilingual training sentence pairs $D_{augment}$ related to the field may be obtained based on the limited M generalized bilingual sentence patterns and N bilingual vocabularies in the corresponding field.

For example, the following ten augmented bilingual training sentence pairs may be constructed by adopting two bilingual sentence patterns related to the field of personal names in Table 8 and five bilingual notional words in Table 4. Table 10 below illustrates an augmented bilingual training sentence pair according to an exemplary embodiment. In the embodiment, $D_{augment}$ may include following:

TABLE 10

Augmented bilingual training sentence pairs

| | Augmented bilingual training sentence in first language | Augmented bilingual training sentence in second language |
|---|---|---|
| 1 | 刘XX 将于 周五 晚间 在 澳大利亚 首都 堪培拉同 澳大利亚 总理 会晤 。 | liu XX will meet with australian prime minister in the australian capital canberra on friday night. |

TABLE 10-continued

Augmented bilingual training sentence pairs

| | Augmented bilingual training sentence in first language | Augmented bilingual training sentence in second language |
|---|---|---|
| 2 | 张XX 将于 周五 晚间 在 澳大利亚 首都 堪培拉同 澳大利亚 总理 会晤 。 | zhang XX will meet with australian prime minister in the australian capital canberra on friday night. |
| 3 | 蔡XX 将于 周五 晚间 在 澳大利亚 首都 堪培拉同 澳大利亚 总理 会晤 。 | cai XX will meet with australian prime minister in the australian capital canberra on friday night. |
| 4 | 林XX 将于 周五 晚间 在 澳大利亚 首都 堪培拉同 澳大利亚 总理 会晤 。 | lin XX will meet with australian prime minister in the australian capital canberra on friday night. |
| 5 | 李XX 将于 周五 晚间 在 澳大利亚 首都 堪培拉同 澳大利亚 总理 会晤 。 | li XX will meet with australian prime minister in the australian capital canberra on friday night. |
| 6 | 你 认识 刘XX 么？ | do you know liu XX? |
| 7 | 你 认识 张XX 么？ | do you know zhang XX? |
| 8 | 你 认识 蔡XX 么？ | do you know cai XX? |
| 9 | 你 认识 林XX 么？ | do you know lin XX? |
| 10 | 你 认识 李XX 么？ | do you know li XX? |

In operation 204, the augmented bilingual training set and the original bilingual training set are fused, and the machine translation model is retrained based on the target bilingual training set obtained by the fusion.

In the embodiment, the augmented bilingual training set $D_{augment}$ generated in operation 203 and the original bilingual training set D may be combined to construct a larger-scale target bilingual training set $D'=\{D, D_{augment}\}$, and a preset translation model may be retrained based on D' to obtain a new machine translation model, so that the translation quality of the machine translation model can be improved.

In the embodiments of the present disclosure, by automatically excavating the bilingual sentence pattern and the manually labeled bilingual sentence pattern in the corpus data in the original bilingual training set, and by using accumulated filed-related bilingual dictionary data, a high-quality bilingual sentence pattern with word slot information can be extracted from the original bilingual sentence pair according to the field-related bilingual word; and the augmented bilingual data can be constructed according to the automatically extracted or manually labeled bilingual sentence pattern with the word slot information and the field-related bilingual word, so that a large scale of high-quality and field-related bilingual corpus data can be generated for training the machine translation model.

The new bilingual corpora data may contain a large amount of new word information or new bilingual sentence pattern information, and a translation error fed back by a user may be taken as a consideration factor, so the quality of translating new words, hot words and other notional words of the original machine translation model can be improved effectively, and the quality of translating a sentence pattern not found in the original bilingual corpus data of the machine translation model can also be improved, thereby effectively improving user experience in use of a machine translation product.

Figure 3:
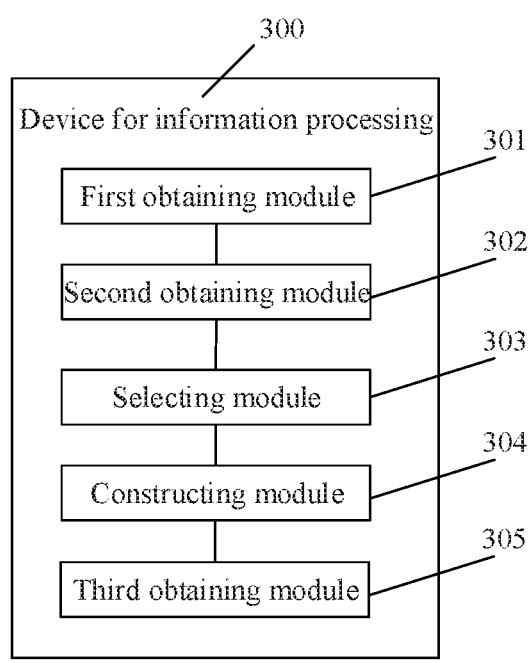
FIG. 3 is a block diagram of a device for information processing according to an exemplary embodiment.

FIG. 3 is a block diagram of a device 300 for information processing according to an exemplary embodiment. As shown in FIG. 3, the device 300 for information processing may include: a first obtaining module 301, configured to obtain a bilingual vocabulary containing N original bilingual word pairs, each of the N original bilingual word pairs containing a first word represented in a first language and a second word represented in a second language and having same meaning as the first word, and N being a positive integer; a second obtaining module 302, configured to obtain an original bilingual training set containing multiple original bilingual training sentence pairs, each original bilingual training sentence pair containing a first training sentence represented in the first language and a second training sentence represented in the second language and having same meaning as the first training sentence; a selecting module 303, configured to select at least one original bilingual training sentence pair matching any of the N original bilingual word pairs from the original bilingual training set as at least one bilingual sentence pair candidate; a constructing module 304, configured to construct a generalized bilingual sentence pattern based on at least one bilingual sentence pair candidate; and a third obtaining module 305, configured to obtain an augmented bilingual training set containing multiple augmented bilingual training sentence pairs based on the bilingual vocabulary and the generalized bilingual sentence pattern.

In some embodiments, the first training sentence contained in the original bilingual training sentence pair selected as the bilingual sentence pair candidate at least may include: the first word contained in any of the N original bilingual word pairs; and the second training sentence contained in the original bilingual training sentence pair selected as the bilingual sentence pair candidate at least may include: the second word having the same meaning as the first word contained in any of the N original bilingual word pairs.

In some embodiments, the constructing module 304 may be configured, for example, to: determine, from the at least one bilingual sentence pair candidate, M bilingual sentence pairs to be generalized according to a preset condition; M being a positive integer; and generate M generalized bilingual sentence patterns based on the M bilingual sentence pairs to be generalized.

The third obtaining module 305 may be configured, for example, to: generate multiple augmented bilingual training sentence pairs according to the M generalized bilingual sentence patterns and the N original bilingual word pairs contained in the bilingual vocabulary; and obtain the augmented bilingual training set based on the multiple augmented bilingual training sentence pairs.

In some embodiments, the preset condition may include at least one of following: both a sentence length of the first training sentence and a sentence length of the second training sentence are greater than or equal to a preset sentence length threshold; a ratio of a sentence length of the first training sentence to a sentence length of the second training sentence is greater than or equal to a first preset ratio, and smaller than or equal to a second preset ratio; or both translation accuracy of the first training sentence and translation accuracy of the second training sentence are greater than a preset accuracy threshold.

In some embodiments, the constructing module 304 may be further configured, for example, to: replace K original bilingual word pairs contained in the M bilingual sentence pairs to be generalized with K general bilingual word pairs and generate the M generalized bilingual sentence patterns; K being a positive integer.

The third obtaining module 305 may be further configured, for example, to: replace each of the K general bilingual word pairs in the M generalized bilingual sentence patterns with N original bilingual word pairs contained in the bilingual vocabulary and generate K*N*M augmented bilingual training sentence pairs.

In some embodiments, the general bilingual word may include: a non-terminating character. The non-terminating character may be for indicating that a sentence is not terminated.

In some embodiments, the device 300 may further include: a fusion module configured to perform fusion processing on the augmented bilingual training set and the original bilingual training set to obtain a target bilingual training set; and a training module configured to perform model training to obtain a target translation model based on the target bilingual training set.

The target translation model may be for translating a sentence between the first language and the second language.

With regard to the device in the above embodiments, the specific mode of each module performing operations has been described in detail in the embodiments of the method, so it will not be repeated here.

Figure 4:
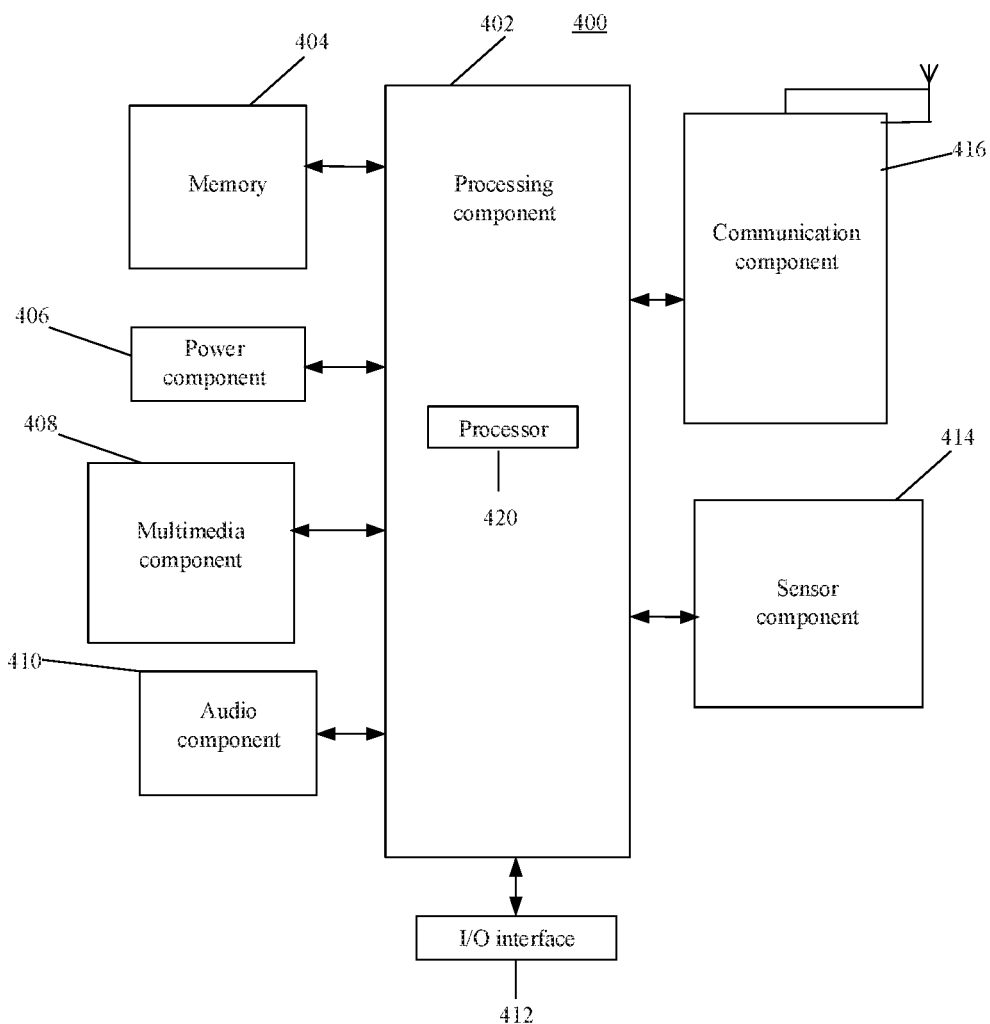
FIG. 4 is a block diagram of a device for information processing according to an exemplary embodiment.

FIG. 4 is a block diagram of a device 400 for information processing according to an exemplary embodiment. For example, the device 400 may be a mobile phone, a computer, a digital broadcast terminal, a messaging device, a gaming console, a tablet, a medical device, exercise equipment and a personal digital assistant.

Referring to FIG. 4, the device 400 may include one or more of the following components: a processing component 402, a memory 404, a power component 406, a multimedia component 408, an audio component 410, an Input/Output (I/O) interface 412, a sensor component 414, and a communication component 416.

The processing component 402 is typically configured to control overall operations of the device 400, such as the operations associated with display, telephone calls, data communications, camera operations, and recording operations. The processing component 402 may include one or more processors 420 to execute instructions to perform all or part of the operations in the above method. Moreover, the processing component 402 may include one or more modules which facilitate interaction between the processing component 402 and other components. For instance, the processing component 402 may include a multimedia module to facilitate interaction between the multimedia component 408 and the processing component 402.

The memory 404 is configured to store various types of data to support the operation of the device 400. Examples of such data may include instructions for any application programs or methods operated on the device 400, contact data, phonebook data, messages, pictures, video, etc. The memory 404 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 406 is configured to provide power for various components of the device 400. The power component 406 may include a power management system, one or more power supplies, and other components associated with generation, management and distribution of power for the device 400.

The multimedia component 408 may include a screen for providing an output interface between the device 400 and a user. In some embodiments, the screen may include a Liquid Crystal Display (LCD) and a Touch Panel (TP). If the screen includes the TP, the screen may be implemented as a touch screen to receive an input signal from the user. The TP may include one or more touch sensors to sense touches, swipes and gestures on the TP. The touch sensors may not only sense a boundary of a touch or swipe action but also detect a duration and pressure associated with the touch or swipe action. In some embodiments, the multimedia component 408 may include a front camera and/or a rear camera. The front camera and/or the rear camera may receive external multimedia data when the device 400 is in an operation mode, such as a photographing mode or a video mode. Each of the front camera and the rear camera may be a fixed optical lens system or have focusing and optical zooming capabilities.

The audio component 410 is configured to output and/or input an audio signal. For example, the audio component 410 includes a Microphone (MIC), and the MIC is configured to receive an external audio signal when the device 400 is in the operation mode, such as a call mode, a recording mode and a voice recognition mode. The received audio signal may further be stored in the memory 404 or sent through the communication component 416. In some embodiments, the audio component 410 further includes a speaker configured to output the audio signal.

The I/O interface 412 is configured to provide an interface between the processing component 402 and a peripheral interface module. The peripheral interface module may be a keyboard, a click wheel, a button, etc. The button may include, but not limited to: a home button, a volume button, a starting button and a locking button.

The sensor component 414 may include one or more sensors configured to provide status assessment in various aspects for the device 400. For instance, the sensor component 414 may detect an on/off status of the device 400 and relative positioning of components, such as a display and small keyboard of the device 400, and the sensor component 414 may further detect a change in a position of the device 400 or a component of the device 400, presence or absence of contact between the user and the device 400, orientation or acceleration/deceleration of the device 400 and a change in temperature of the device 400. The sensor component 414 may include a proximity sensor configured to detect presence of an object nearby without any physical contact. The sensor component 414 may also include a light sensor, such as a Complementary Metal Oxide Semiconductor (CMOS) or Charge Coupled Device (CCD) image sensor, configured for use in an imaging application. In some embodiments, the sensor component 414 may also include an acceleration sensor, a gyroscope sensor, a magnetic sensor, a pressure sensor or a temperature sensor.

The communication component 416 is configured to facilitate wired or wireless communication between the device 400 and another device. The device 400 may access a communication-standard-based wireless network, such as a Wireless Fidelity (WiFi) network, a 4th-Generation (4G) or 5th-Generation (5G) network or a combination thereof. In an exemplary embodiment, the communication component 416 receives a broadcast signal or broadcast associated information from an external broadcast management system through a broadcast channel. In an exemplary embodiment, the communication component 416 may further include a Near Field Communication (NFC) module to facilitate short-range communication. In an exemplary embodiment, the communication component 416 may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 400 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above method.

In an exemplary embodiment, there is also provided a non-transitory computer-readable storage medium including instructions, such as the memory 404 including instructions, and the instructions may be executed by the processor 420 of the device 400 to implement the above described methods. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device and the like.

Other embodiments of the present disclosure will be apparent to those skilled in the art from consideration of the specification and practice of the present disclosure. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for information processing, comprising:
   obtaining, by an electronic device, a bilingual vocabulary containing N original bilingual word pairs, wherein each of the N original bilingual word pairs contains a first word represented in a first language and contains a second word represented in a second language and having same meaning as the first word, and N is a positive integer;
   obtaining, by the electronic device, an original bilingual training set containing multiple original bilingual training sentence pairs, wherein each of the multiple original bilingual training sentence pairs contains a first training sentence represented in the first language and contains a second training sentence represented in the second language and having same meaning as the first training sentence;
   selecting, by the electronic device from the original bilingual training set, at least one original bilingual training sentence pair matching any of the N original bilingual word pairs as at least one bilingual sentence pair candidate;
   constructing, by the electronic device, a generalized bilingual sentence pattern based on the at least one bilingual sentence pair candidate;
   obtaining, by the electronic device, an augmented bilingual training set containing multiple augmented bilingual training sentence pairs, based on the bilingual vocabulary and the generalized bilingual sentence pattern;

performing, by the electronic device, fusion processing on the augmented bilingual training set and the original bilingual training set to obtain a target bilingual training set;

performing, by the electronic device, model training to obtain a target translation model based on the target bilingual training set; and translating a sentence between the first language and the second language by using the target translation model, wherein constructing, by the electronic device, the generalized bilingual sentence pattern based on the at least one bilingual sentence pair candidate comprises:

determining, by the electronic device from the at least one bilingual sentence pair candidate, M bilingual sentence pairs to be generalized according to a preset condition, wherein M is a positive integer, and the preset condition comprises: a ratio of a sentence length of the first training sentence to a sentence length of the second training sentence is greater than or equal to a first preset ratio, and smaller than or equal to a second preset ratio; and generating, by the electronic device, M generalized bilingual sentence patterns based on the M bilingual sentence pairs to be generalized.

2. The method of claim 1, wherein the first training sentence contained in the original bilingual training sentence pair selected as the bilingual sentence pair candidate comprises: the first word contained in any of the N original bilingual word pairs; and the second training sentence contained in the original bilingual training sentence pair selected as the bilingual sentence pair candidate comprises: the second word having same meaning as the first word contained in any of the N original bilingual word pairs.

3. The method of claim 2, wherein obtaining, by the electronic device, the augmented bilingual training set containing the multiple augmented bilingual training sentence pairs based on the bilingual vocabulary and the generalized bilingual sentence pattern comprises:

generating, by the electronic device, the multiple augmented bilingual training sentence pairs according to the M generalized bilingual sentence patterns and the N original bilingual word pairs contained in the bilingual vocabulary; and obtaining, by the electronic device, the augmented bilingual training set based on the multiple augmented bilingual training sentence pairs.

4. The method of claim 3, wherein the preset condition further comprises at least one of:

both the sentence length of the first training sentence and the sentence length of the second training sentence are greater than or equal to a preset sentence length threshold; or both translation accuracy of the first training sentence and translation accuracy of the second training sentence are greater than a preset accuracy threshold.

5. The method of claim 3, wherein generating, by the electronic device, the M generalized bilingual sentence patterns based on the M bilingual sentence pairs to be generalized comprises:

replacing, by the electronic device, K original bilingual word pairs contained in the M bilingual sentence pairs to be generalized with K general bilingual word pairs and generating the M generalized bilingual sentence patterns, wherein K is a positive integer; and generating, by the electronic device, the multiple augmented bilingual training sentence pairs according to the M generalized bilingual sentence patterns and the N original bilingual word pairs contained in the bilingual vocabulary comprises:

replacing, by the electronic device, each of the K general bilingual word pairs in the M generalized bilingual sentence patterns with the N original bilingual word pairs contained in the bilingual vocabulary and generating K*N*M augmented bilingual training sentence pairs.

6. The method of claim 5, wherein the general bilingual word comprises a non-terminating character, the non-terminating character indicating that a sentence is not terminated.

7. A device for information processing, comprising:

a processor; and a memory configured to store instructions executable by the processor, wherein the processor is configured to:

obtain a bilingual vocabulary containing N original bilingual word pairs, wherein each of the N original bilingual word pairs contains a first word represented in a first language and contains a second word represented in a second language and having the same meaning as the first word, and N is a positive integer;

obtain an original bilingual training set containing multiple original bilingual training sentence pairs, wherein each of the multiple original bilingual training sentence pairs contains a first training sentence represented in the first language and a second training sentence represented in the second language and having same meaning as the first training sentence;

select, from the original bilingual training set, at least one original bilingual training sentence pair matching any of the N original bilingual word pairs as at least one bilingual sentence pair candidate;

construct a generalized bilingual sentence pattern based on the at least one bilingual sentence pair candidate;

obtain an augmented bilingual training set containing multiple augmented bilingual training sentence pairs based on the bilingual vocabulary and the generalized bilingual sentence pattern;

perform fusion processing on the augmented bilingual training set and the original bilingual training set to obtain a target bilingual training set;

perform model training to obtain a target translation model based on the target bilingual training set; and translate a sentence between the first language and the second language by using the target translation model, wherein the processor is further configured to:

determine, from the at least one bilingual sentence pair candidate, M bilingual sentence pairs to be generalized according to a preset condition, wherein M is a positive integer, and the preset condition comprises: a ratio of a sentence length of the first training sentence to a sentence length of the second training sentence is greater than or equal to a first preset ratio, and smaller than or equal to a second preset ratio; and generate M generalized bilingual sentence patterns based on the M bilingual sentence pairs to be generalized.

8. The device of claim 7, wherein the first training sentence contained in the original bilingual training sentence pair selected as the bilingual sentence pair candidate comprises: the first word contained in any of the N original bilingual word pairs; and
the second training sentence contained in the original bilingual training sentence pair selected as the bilingual sentence pair candidate comprises: the second word having same meaning as the first word contained in any of the N original bilingual word pairs.

9. The device of claim 8, wherein the processor is further configured to:
generate the multiple augmented bilingual training sentence pairs according to the M generalized bilingual sentence patterns and the N original bilingual word pairs contained in the bilingual vocabulary; and
obtain the augmented bilingual training set based on the multiple augmented bilingual training sentence pairs.

10. The device of claim 9, wherein the preset condition further comprises at least one of:
both the sentence length of the first training sentence and the sentence length of the second training sentence are greater than or equal to a preset sentence length threshold; or
both translation accuracy of the first training sentence and translation accuracy of the second training sentence are greater than a preset accuracy threshold.

11. The device of claim 9, wherein the processor is further configured to:
replace K original bilingual word pairs contained in the M bilingual sentence pairs to be generalized with K general bilingual word pairs and generate the M generalized bilingual sentence patterns, wherein K is a positive integer; and
replace each of the K general bilingual word pairs in the M generalized bilingual sentence patterns with the N original bilingual word pairs contained in the bilingual vocabulary and generate K*N*M augmented bilingual training sentence pairs.

12. The device of claim 11, wherein the general bilingual word comprises a non-terminating character, the non-terminating character indicating that a sentence is not terminated.

13. A non-transitory computer-readable storage medium having stored thereon instructions, that when executed by a processor of a device, cause the device to perform a method for information processing, the method comprising:
obtaining a bilingual vocabulary containing N original bilingual word pairs, wherein each of the N original bilingual word pairs contains a first word represented in a first language and contains a second word represented in a second language and having same meaning as the first word, and N is a positive integer;
obtaining an original bilingual training set containing multiple original bilingual training sentence pairs, wherein each of the multiple original bilingual training sentence pairs contains a first training sentence represented in the first language, and a second training sentence represented in the second language and having same meaning as the first training sentence;
selecting, from the original bilingual training set, at least one original bilingual training sentence pair matching any of the N original bilingual word pairs as at least one bilingual sentence pair candidate;
constructing a generalized bilingual sentence pattern based on the at least one bilingual sentence pair candidate;
obtaining an augmented bilingual training set containing multiple augmented bilingual training sentence pairs based on the bilingual vocabulary and the generalized bilingual sentence pattern;
performing fusion processing on the augmented bilingual training set and the original bilingual training set to obtain a target bilingual training set;
performing model training to obtain a target translation model based on the target bilingual training set; and
translating a sentence between the first language and the second language by using the target translation model,
wherein constructing the generalized bilingual sentence pattern based on the at least one bilingual sentence pair candidate comprises:
determining, from the at least one bilingual sentence pair candidate, M bilingual sentence pairs to be generalized according to a preset condition, wherein M is a positive integer, and the preset condition comprises: a ratio of a sentence length of the first training sentence to a sentence length of the second training sentence is greater than or equal to a first preset ratio, and smaller than or equal to a second preset ratio; and
generating M generalized bilingual sentence patterns based on the M bilingual sentence pairs to be generalized.

14. The non-transitory computer-readable storage medium of claim 13, wherein
the first training sentence contained in the original bilingual training sentence pair selected as the bilingual sentence pair candidate comprises: the first word contained in any of the N original bilingual word pairs; and
the second training sentence contained in the original bilingual training sentence pair selected as the bilingual sentence pair candidate comprises: the second word having same meaning as the first word contained in any of the N original bilingual word pairs.

15. The non-transitory computer-readable storage medium of claim 14,
wherein obtaining the augmented bilingual training set containing the multiple augmented bilingual training sentence pairs based on the bilingual vocabulary and the generalized bilingual sentence pattern comprises:
generating the multiple augmented bilingual training sentence pairs according to the M generalized bilingual sentence patterns and the N original bilingual word pairs contained in the bilingual vocabulary; and
obtaining the augmented bilingual training set based on the multiple augmented bilingual training sentence pairs.

16. The non-transitory computer-readable storage medium of claim 15, wherein the preset condition further comprises at least one of:
both the sentence length of the first training sentence and the sentence length of the second training sentence are greater than or equal to a preset sentence length threshold; or
both translation accuracy of the first training sentence and translation accuracy of the second training sentence are greater than a preset accuracy threshold.

17. The non-transitory computer-readable storage medium of claim 15, wherein
generating the M generalized bilingual sentence patterns based on the M bilingual sentence pairs to be generalized comprises:
replacing K original bilingual word pairs contained in the M bilingual sentence pairs to be generalized with K general bilingual word pairs and generating the M generalized bilingual sentence patterns, wherein K is a positive integer; and generating the multiple augmented bilingual training sentence pairs according to the M generalized bilingual sentence patterns and the N original bilingual word pairs contained in the bilingual vocabulary comprises:
   replacing each of the K general bilingual word pairs in the M generalized bilingual sentence patterns with the N original bilingual word pairs contained in the bilingual vocabulary and generating K*N*M augmented bilingual training sentence pairs.

18. The non-transitory computer-readable storage medium of claim 17, wherein the general bilingual word comprises a non-terminating character, the non-terminating character indicating that a sentence is not terminated.

* * * * *